Patented Dec. 2, 1952

2,620,280

UNITED STATES PATENT OFFICE 2,620,280

COMPOSITION AND PROCESS FOR BLOOD ADHESIVES

Louise K. Fencil, Brookfield, Edward F. Cavanaugh, Wilmette, and Raymond H. Borkenhagen, Chicago, Ill., assignors to Armour and Company, Chicago, Ill., a corporation of Illinois No Drawing. Application October 18, 1947, Serial No. 780,760

18 Claims. (Cl. 106—124)

This invention relates to the preparation of animal blood adhesives. More particularly it is concerned with a combination of animal blood and water soluble, aliphatic, halogenated alcohols.

For a long time the waste blood resulting from packing-house operations has been recognized as a valuable source of adhesives. This has been especially noticeable in the plywood industry where hot pressing methods are used to set and coagulate the blood between the respective plys of wood. At one time blood products were used exclusively for this work. In recent years, however, various other substances such as phenolic resins, melamine and urea formaldehyde resins, in combinations with a variety of filler substances, have come into substantially greater importance as adhesives. The reason for this trend has been due to the superior color, water resistance and durability obtainable with the resinous type adhesives. Efforts to improve these qualities in a blood adhesive have been only partially successful.

The earlier work on treating blood to improve its durability and water resistance for hot pressed plywood consisted of adding hydrated lime solution to a dried blood and ammonium hydroxide solution. Adhesives prepared in this way were only slightly more water resistant and deteriorated rapidly because of the highly alkaline conditions. Consequently, they have not been used commercially. Next, formulas were developed for the use of blood albumin without resorting to hot pressing methods. These involved the use of a dried blood, water, ammonium hydroxide and a paraformaldehyde mixture. While the resulting bonds made with this material were water resistant, they lacked strength and uniformity and were not acceptable to the industry. More recently the problem has been approached with the idea of making combinations of blood and alkali with varying proportions of resins. These methods also have not solved the problem of supplying good adhesives at a low cost. We have, therefore, set ourselves to the task of preparing a blood adhesive which circumvents the recited disadvantages of these early products in the art and which can be produced at a reasonable cost.

Certain specific objects of our invention are to provide a blood adhesive having a substantially increased "working life"; to provide a product free of the disagreeable odors usually associated with liquid blood; to provide a blood adhesive which can readily be thinned with water; to provide a high strength adhesive which can be used with either cold or hot set pressing methods and to provide a product of smooth uniform consistency which will not deteriorate upon long periods of non-use. Yet another object of our invention is to greatly increase the water resistance and durability of bonds prepared with the described blood adhesive. Other specific objects and advantages will appear as the specification proceeds.

We have discovered that liquid water-soluble aliphatic halogenated alcohol may be employed to insolubilize animal blood proteins to make them suitable for adhesive purposes. We have further learned ways and means of controlling the apparent denaturation reaction which occurs when the above class of solvents comes in contact with blood proteins.

The aforementioned blood proteins may be obtained from a variety of well known blood products. Examples of these are dried or liquid whole blood including all of the natural proteins such as albumins, globulins and globin; other examples are the fractions of blood such as the red cell or hemoglobin fraction and the plasma or non-cellular portion of blood. In this specification and claims the term "blood" is used to designate whole blood or fractions thereof in liquid or solid form.

That the aliphatic halogenated alcohols should have such a pronounced insolubilizing effect upon blood proteins is surprising indeed. In a pending application (Ser. No. 710,415), by one of the present co-inventors, it was pointed out that these same aliphatic halogenated alcohols have a definite solubilizing effect when applied to the proteins found in animal glue. In that case it was shown that when halogen substituted alcohols are added to dry glue the glue is converted into an unstable liquid mixture. When used in conjunction with dry blood proteins, however, the opposite effect occurs almost immediately. There is an initial gelation of the proteins in the solvent followed by a distinct insolubility of the protein mass in water, indicating that denaturation has taken place.

We have found that when liquid blood is used a similar denaturation occurs but at a different rate. The denaturing effect of such substituted alcohols on blood protein is quite different from the denaturant effect occasioned when ordinary alcohol is incorporated into liquid blood. In the latter case, the ordinary alcohols such as methyl, ethyl or propyl alcohol act as precipitants upon the heat coagulable and other proteins found in blood and such precipitates are entirely devoid of adhesive properties. When halogenated alcohols are used there is no precipitation of the proteins, but instead, a slow gelation involving protein, water and solvent together. There is, furthermore, no loss of adhesive quality with this type of denaturation. Rather, this characteristic of the blood is considerably improved.

We have further found that in order to produce a substance acceptable for a wide variety of uses as an adhesive, a critical ratio of blood proteins, halogen substituted alcohol and water must be maintained. To accomplish this, we must recognize the effect each of these substances has upon the other. For instance, when a hundred parts of spray dried whole blood are treated with eight hundred parts of ethylene chlorohydrin by simply mixing at room temperature, a stiff mixture results within an hour. In the adhesives business this would be referred to as having a "working life" of less than an hour. (The term "working life" is defined as the elapsed time, starting when the adhesive is in a workable condition and ending at the point of solidification, when the material can no longer be spread upon a surface, either manually or mechanically.) However, when a lot of one hundred parts of the same spray dried whole blood is pretreated with a hundred parts of water and then with seven or eight hundred parts of ethylene chlorohydrin in the same manner, the "working life" of the resultant product may be increased to at least 350 hours.

When using dried blood we have found it immaterial, as far as the final adhesive is concerned, whether the water be added to the blood first or whether the organic solvent and water are first stirred together and added simultaneously to the blood. Somehow, the water delays the denaturation reaction if it is not added after the reaction has begun. We prefer to add the solvent-water mixture together to the dry blood in order to avoid an initial graininess in the mix which occurs with the former method.

In the above example the blood solids were at about 12% with respect to the total contens calculated on a weight basis. Our experiments have shown it is possible to decrease the dry blood solids to about 5% of the total mix or to increase them to 15% without upsetting the general adhesive properties, or the working life of the product. On the other hand, when liquid blood is used it is quite possible to incorporate a great deal more of blood protein solids into the organic solvent than is feasible with dried blood.

As an example, if vacuo concentrated whole blood, or fractions thereof, such as the separated red blood cell fraction called liquid hemoglobin, are employed it becomes practicable to increase the total protein solids to 30 or 40% of the final adhesive without decreasing the "working life." This is perhaps due to the fact that such proteins are still in their native state and, not having been subjected to the denaturing operation of drying, they are more slowly denatured by the halogen substituted alcohols. With native or liquid blood proteins the ultimate denaturant effect of the substituted alcohols is substantially the same as with the partially denatured dried blood proteins. We therefore prefer to use liquid blood in our invention because of the increased delay in "setting up" time and the higher solids possible in the final adhesive product.

We can use any halogen substituted alcohol. Among the alcohols which are useful in this invention are ethylene chlorohydrin, monochlorglycerol, propylene chlorohydrin, dichlorohydrin, ethylene bromohydrin and ethylene flurohydrin. Various combinations are also acceptable. We prefer to use ethylene chlorohydrin.

For some reason yet unexplained, various combinations of the above substituted alcohols will alter the rate of denaturation of blood proteins. Monochlorglycerol seems to be outstanding in this respect. When added to whole blood or hemoglobin paste it retards and actually prevents the more reactive alcohols like ethylene chlorohydrin from too rapidly denaturing the blood.

The amount of organic solvent which is to be used depends upon several factors. The water and organic solvent ratio must be taken into account as well as the total blood protein solids. As stated earlier, at no time have we found it possible to treat dry blood with halogenated alcohols alone without causing a rapid irreversible gelling reaction to occur. It is necessary to have at least an equal weight of water present to each weight of protein solids. When this condition is met we have found that unlimited amounts of organic solvent may be added without affecting the "working life" of the adhesive. Of course, economic limitations immediately suggest that the minimum amounts of substituted alcohol be used. We find that alcohol in the amount of about 10% of the blood solids present is about the practical minimum. With less than this amount of alcohol the bonds prepared from such adhesives have less strength and water resistance. This minimum amount of substituted alcohol applies either to liquid or dried blood proteins. We feel that 20% of the alcohol gives a very acceptable product with respect to over-all performance.

The water content of the adhesive can be varied considerably beyond the recommended equivalent weight required to wet the proteins. It is only necessary to avoid diluting with so much water that the prescribed ratio of protein solids and organic solvent is upset.

The products of our invention have been tested for "working life," strength and water resistance in a number of standard ways. The workability of any adhesive is easily determined by dipping a spatula into a container of the material and withdrawing it at a uniform rate. As long as the drippings flow from the spatula without forming a short stiff string, the adhesive will be suitable for spreading.

To determine the resistance of our adhesives to hot water we have resorted to what is known as the repeated boiling schedule. In carrying out this operation, wood bonds first are made by gluing together two blocks of wood 2″x2″x½″ in dimension, such as, pine, oak, birch, fir, mahogany, etc., in a hydraulic press at a pressure of 75 to 200 lbs./sq. in., depending upon the wood being used. During the pressure process they are subjected to a temperature of 60–70° C. in order to accelerate the denaturation and coagulate the blood in the bond. Upon cooling down to room temperature these blocks are immersed in boiling water for 7 hours and air dried afterwards for 17 hours. This is repeated for 3 cycles which gives a total boiling time of 21 hours. None of the joints prepared with the adhesive composition herein disclosed boiled apart and upon drying and breaking showed almost total wood failure.

With similar blocks prepared by a cold press method, we have found the hot water resistance to be as good as that of the above procedure.

In order to ascertain the resistance of these adhesives to cold water, straight soaking tests have been employed. The blocks which are prepared according to the above method are submerged in cold water in a vacuum vessel. The vessel is evacuated until air bubbles can no longer be seen coming out of the wood. By this time the wood is thoroughly saturated and will not float. The blocks are kept submerged for 24-48 hours and then removed to be tested for strength by standard methods in the wet or dry state. With all of the adhesives prepared in the manner above described, the wood failure was well over the 90% mark.

Following are some specific examples of the method of preparation of the products of our invention:

*Example I*

100 gms. spray dried whole blood
300 gms. ethylene chlorohydrin

The blood is stirred into the organic solvent at room temperature. "Working life" 10 minutes (Control).

*Example II*

100 gms. spray dried whole blood
100 gms. water
200 gms. propylene chlorohydrin
0.5 gm. sodium silicoflouride The water and the organic solvent are premixed at room temperature and the blood is stirred in at room temperature. "Working life," 350 hours.

*Example III*

100 gms. spray dried whole blood
100 gms. water
30 gms. ethylene fluorohydrin
0.5 gm. silicofluoride The water is added to the blood. Next the organic solvent is added at room temperature. "Working life," 400 hours.

*Example IV*

100 gms. liquid whole blood (20% protein solids)
2 gms. monochlorglycerol
1 gm. ethylene chlorohydrin
0.3 gm. silicofluoride The organic solvents and preservative are mixed together and added directly to the blood at room temperature. "Working life," 500 hours.

*Example V*

100 gms. liquid hemoglobin (35% red cell solids)
2 gms. glycerol chlorohydrin
10 gms. ethylene chlorohydrin
0.3 gm. sodium silicofluoride The monochlorglycerol is first added to the hemoglobin and then the ethylene chlorohydrin and preservative are stirred in at room temperature. "Working life," 400 hours.

*Example VI*

100 gms. liquid hemoglobin
70 gms. ethylene flurohydrin
0.3 gm. sodium silicofluoride The solvent and preservative are stirred slowly into the hemoglobin at room temperature.

*Example VII*

100 gms. liquid whole blood (20% solids)
3 gms. glycerol chlorohydrin
15 gms. dichlorohydrin
0.2 gm. sodium silicofluoride The solvents are stirred into the blood with preservative at room temperature.

The foregoing specific examples have been included for purposes of explanation and it is understood that the invention may be practiced in a variety of ways, all within the spirit of the invention.

Having thus described our invention, what we claim is:

1. An adhesive product consisting of animal blood, an amount of water which is at least equal in weight to the amount of protein solids present in said animal blood, and about 10-90% of a liquid, water soluble, aliphatic, halogen substituted alcohol.

2. An adhesive product consisting of animal blood, an amount of water which is at least equal in weight to the amount of protein solids present in said animal blood, and about 10-90% of ethylene chlorohydrin.

3. An adhesive product consisting of animal blood, an amount of water which is at least equal in weight to the amount of protein solids present in said animal blood, and about 10-90% of propylene chlorohydrin.

4. An adhesive product consisting of animal blood, an amount of water which is at least equal in weight to the amount of protein solids present in said animal blood, and about 10-90% of a mixture of monochlorglycerol and ethylene chlorohydrin.

5. An adhesive product consisting of liquid hemoglobin, an amount of water which is at least equal in weight to the amount of protein solids present in said liquid hemoglobin, and about 10-90% of a liquid, water soluble, aliphatic, halogen substituted alcohol.

6. An adhesive product consisting of liquid hemoglobin, an amount of water which is at least equal in weight to the amount of protein solids present in said liquid hemoglobin, and about 10-90% of propylene chlorohydrin.

7. An adhesive product consisting of liquid hemoglobin, an amount of water which is at least equal in weight to the amount of protein solids present in said liquid hemoglobin, and about 10-90% of ethylene chlorohydrin.

8. An adhesive product consisting of liquid hemoglobin, an amount of water which is at least equal in weight to the amount of protein solids present in said liquid hemoglobin, and about 10-90% of a mixture of monochlorglycerol and ethylene chlorohydrin.

9. An adhesive product consisting of the dried blood of animals, at least an equal weight of water and about 10-90% of a liquid, water solble, aliphatic halogen substituted alcohol.

10. An adhesive product consisting of the dried blood of animals, at least an equal weight of water and about 10-90% of ethylene chlorohydrin.

11. An adhesive product consisting of the dried blood of animals, at least an equal weight of water, and about 10-90% of propylene chlorohydrin.

12. An adhesive product consisting of the dried blood of animals, at least an equal weight of water, and about 10-90% of a mixture of monochlorglycerol and ethylene chlorohydrin.

13. An adhesive product consisting of dried hemoglobin, at least an equal weight of water, and about 10-90% of a liquid, water soluble, aliphatic, halogen substituted alcohol.

14. An adhesive product consisting of dried hemoglobin, at least an equal weight of water, and about 10–90% ethylene chlorohydrin.

15. An adhesive product consisting of dried hemoglobin, at least an equal weight of water, and about 10–90% of propylene chlorohydrin.

16. An adhesive product consisting of dried hemoglobin, at least an equal weight of water, and about 10–90% of a mixture of monochlorglycerol and ethylene chlorohydrin.

17. A process for producing an adhesive wherein the dried blood of animals is first treated with at least an equal weight of water and subsequently treated with about 10 to 90% of a liquid, water soluble, aliphatic, halogen substituted alcohol.

18. A process for producing an adhesive wherein dried hemoglobin is first treated with at least an equal weight of water and subsequently treated with about 10 to 90% of a liquid, water soluble, aliphatic, halogen substituted alcohol.

LOUISE K. FENCIL.
EDWARD F. CAVANAUGH.
RAYMOND H. BORKENHAGEN.

REFERENCES CITED

The following references are of record in the file of this patent:

UNITED STATES PATENTS

| Number | Name | Date |
|---|---|---|
| 1,395,729 | Plauson | Nov. 1, 1921 |
| 2,089,460 | Wilmanns et al. | Aug. 10, 1937 |

FOREIGN PATENTS

| Number | Country | Date |
|---|---|---|
| 240,174 | Great Britain | July 22, 1926 |